United States Patent [19]

Morinaka et al.

[11] Patent Number: 5,025,883

[45] Date of Patent: Jun. 25, 1991

[54] MOTORCYCLE PROVIDED WITH TRUNKS

[75] Inventors: Shigehisa Morinaka, Saitama; Tai Nakashima, Tokyo; Takeshi Yamazaki, Kanagawa; Kazuo Morishima, Saitama; Yoshiaki Kashio, Saitama; Giichiro Akimori, Saitama, all of Japan

[73] Assignee: Honda Giken Kogyo Kabushiki Kaisha, Tokyo, Japan

[21] Appl. No.: 449,417

[22] Filed: Dec. 15, 1989

Related U.S. Application Data

[63] Continuation of Ser. No. 247,259, Sep. 21, 1988, abandoned.

[30] Foreign Application Priority Data

Oct. 3, 1987 [JP] Japan ................ 62-250250

[51] Int. Cl.5 .................................. B62D 61/02
[52] U.S. Cl. .................. 180/219; 224/32 R; 224/32 A; 224/39; 292/DIG. 25; 296/24.1; 296/76; 297/243; 297/DIG. 9
[58] Field of Search .............. 180/219; 296/24.1, 78.1, 296/76; 224/39, 32 A, 32 R; 70/256; 292/28, 80, 50, DIG. 25; 297/DIG. 9, 243, 457

[56] References Cited

U.S. PATENT DOCUMENTS

| 2,218,257 | 10/1940 | Bulat | 292/50 |
|---|---|---|---|
| 4,163,513 | 8/1979 | Kramer | 224/32 R |
| 4,347,909 | 9/1982 | Takemura et al. | 180/219 |
| 4,440,412 | 4/1984 | Kamiya | 280/288.2 |
| 4,480,773 | 4/1984 | Krauser | 224/32 A |
| 4,501,384 | 2/1985 | Itoh | 224/32 R |
| 4,506,754 | 3/1985 | Hirano et al. | 180/219 |
| 4,549,629 | 10/1985 | Komuro | 180/219 |
| 4,588,114 | 5/1986 | Lebaron et al. | 224/39 |
| 4,600,208 | 7/1986 | Morishima | 296/78.1 |
| 4,690,237 | 9/1987 | Funabashi et al. | 180/219 |

FOREIGN PATENT DOCUMENTS

| 102481 | 3/1984 | European Pat. Off. | 292/DIG. 25 |
|---|---|---|---|
| 143579 | 9/1980 | Fed. Rep. of Germany | 296/24.1 |
| 183595 | 7/1922 | United Kingdom | 224/32 A |

Primary Examiner—Andres Kashnikow
Assistant Examiner—Eric Culbreth
Attorney, Agent, or Firm—Lyon & Lyon

[57] ABSTRACT

A motorcycle provided with a central trunk and left and right trunks at the rear portion of the vehicle body. The vehicle body frame of this motorcycle is composed of a main vehicle body frame at the front and a rear vehicle body frame that can be detachably mounted to this main vehicle body frame. The rear vehicle body frame constitutes a trunk assembly jointly with a central trunk, a left trunk, a right trunk and other equipments such as lamps, and after the above-mentioned trunk assembly has been formed preliminarily as one unit outside of a main assembly line, it is detachably mounted to the main vehicle body frame on the main assembly line. Accordingly, the work on the main assembly line becomes little and simple, and a productivity is improved. Upon replacement of a rear wheel tire, it is only necessary to dismount the entire trunk assembly together with the rear vehicle body frame without individually dismounting a large number of equipments.

9 Claims, 9 Drawing Sheets

MOTORCYCLE PROVIDED WITH TRUNKS

This application is a continuation of application Ser. No. 247,259, filed Sept. 21, 1988 now abandoned.

BACKGROUND OF THE INVENTION

The present invention relates to a motorcycle provided with a plurality of trunks at the rear portion of a vehicle body.

A motorcycle provided with a central trunk and left and right trunks at the rear portion of a vehicle body, has been known. In the case of mounting the above-mentioned three trunks to a vehicle body, it is a common practice that mounting many other pieces of equipment is carried out simultaneously therewith. Such equipment, for instance, a back rest of a seat, armrests for an attendant rider, an antenna, a helmet holder, rear fenders, an air pump assembly, an air distributor, etc. are known.

If the assembly of these many pieces of equipment, including the trunks, is carried out on the main assembly line for the vehicle body, it would adiversely influence assembly of the other parts on the main assembly line and would become a cause of lowering of a productivity since the described assembly necessitates many manhours. In addition, if mismatching should occur in the assembled positional relationship among the trunks and the other equipment in the main assembly line, rectification, and the like which entails inefficient effort must be carried out after completion of assembly of the vehicle body, consequently, the lowering of productivity is compounded. On the other hand, as viewed from the standpoint of handling motorcycles, (as, for example, by users, sale shops, maintenance factories, etc.), in the case of the structure in which the respective trunks and other equipment are individually assembled, when replacement of the rear wheel tire is carried out, much labor is required for dismounting and mounting of the respective equipment, and especially, in the event that mismatching or inaccurate jointer should arise in the assembled positional relationship among the reassembled equipment, this must be corrected later, and so, overall working efficiency would be greatly deteriorated.

SUMMARY OF THE INVENTION

The present invention has it as an object that in a motorcycle provided with a central trunk and left and right trunks at the rear portion of a vehicle body, mounting and dismounting of the respective trunks, as well as pieces of equipment associated therewith hereinafter all collectively referred to as the "trunk assembly", to and from a vehicle body can be carried out simply, easily and efficiently.

According to the present invention, the aforementioned object can be achieved by a motorcyle provided with trunks, wherein a vehicle body frame is composed of a main vehicle body frame at the front and a rear vehicle body frame that can be detachably mounted to this main vehicle body frame. The rear vehicle body frame comprises a trunk assembly having a central trunk, a left trunk, a right trunk and other equipment such as lamps, and wherein the trunk assembly is detachably mounted to the main vehicle body frame as one unit.

With the above-mentioned construction of a motorcycle, for assembly the central trunk, the left trunk, the right trunk, lamps and other equipment can be preliminarily assembled to the rear vehicle body frame outside of the main assembly line and the rear vehicle body frame there after be mounted to the main vehicle body frame during assembly in the main assembly line, so that the number of manhours required for assembly is greatly reduced as compared to the case where the above-mentioned trunks and equipment are individually assembled in the main assembly line. Thus the invention can contribute to improvements in productivity. Also, while the respective equipment in the trunk assembly, consisting of many individual pieces of equipment that are assembled integrally, must be matched with one another in a correct positional relationship, if the matching is not correctly established, it can be easily adjusted outside of the main assembly line. In this respect, therefore, productivity can be improved. Furthermore, upon replacement of a rear wheel tire, since it is only necessary to dismount the entire rear vehicle body frame, replacement of the tire can be carried out efficiently.

DETAILED DESCRIPTION OF THE PREFERRED EMBODIMENT

In the following, description will be made of one preferred embodiment of the present invention shown in FIGS. 1 through 17.

Figure 1:
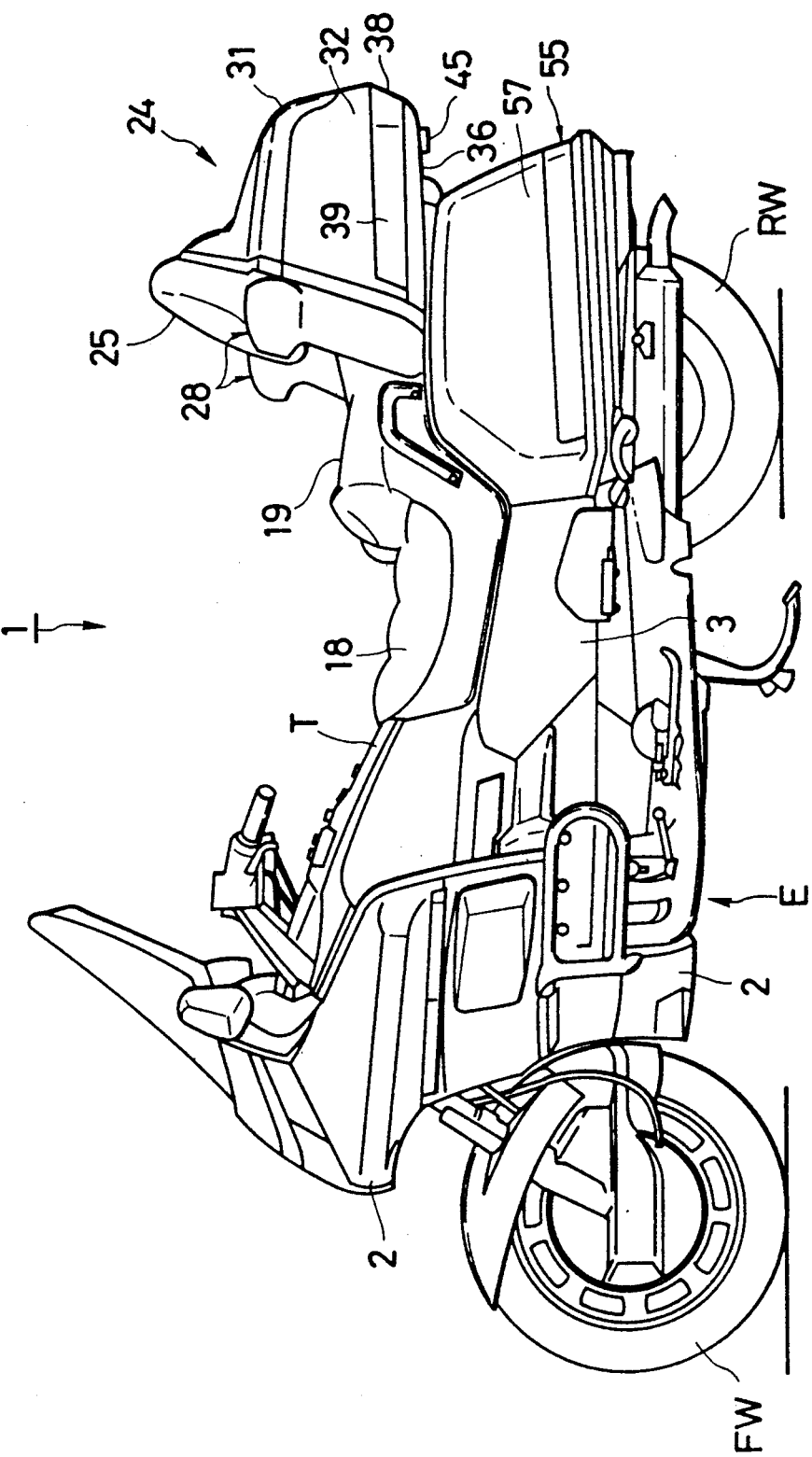
FIG. 1 is a side view of a motorcycle provided with trunks according to one preferred embodiment of the present invention.
Figure 2:
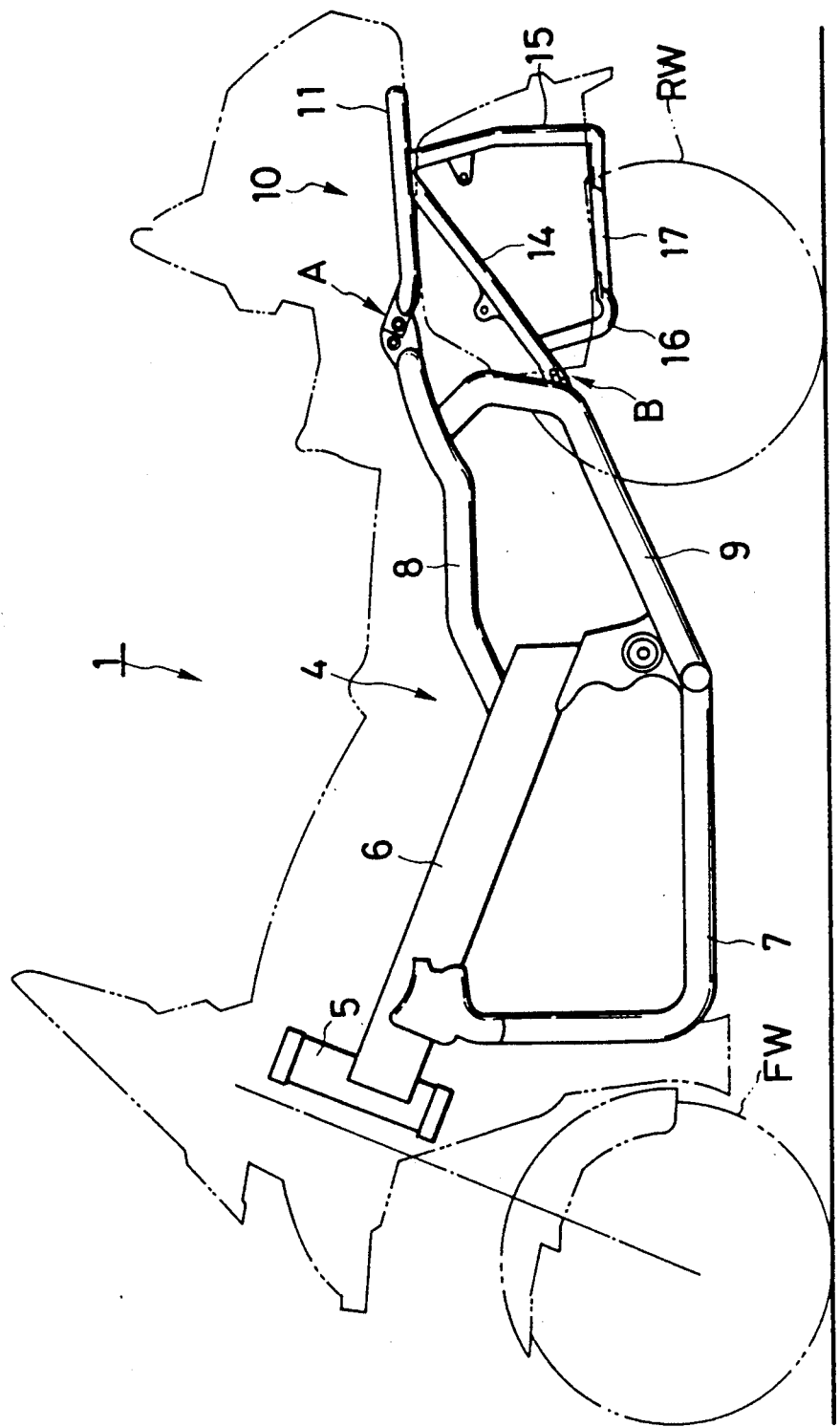
FIG. 2 is a side view showing a vehicle body frame of the same motorcycle.
Figure 3:
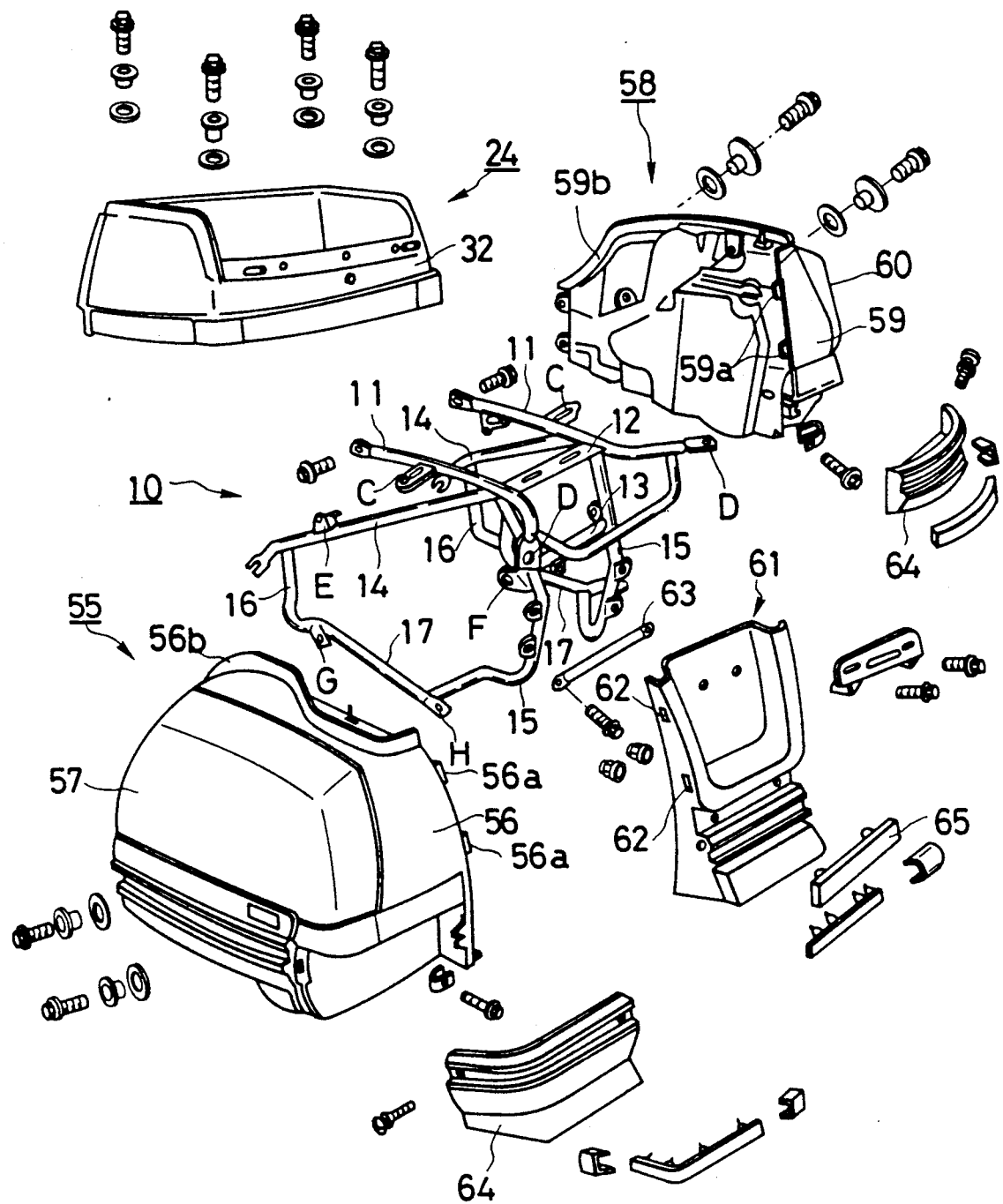
FIG. 3 is an exploded perspective view of a trunk assembly for installation at the rear portion of the vehicle body of the motorcycle of FIG. 1.

As shown in FIG. 1, a motorcycle 1 is provided with an engine E between front and rear wheels FW and RW. A front portion of a vehicle body is covered by a front body cover 2, and left and right side surfaces of the vehicle body are covered by side body covers 3. The vehicle body frame of the motorcycle 1 consists of a main vehicle body frame 4 and a rear vehicle body frame 10, as shown in FIG. 2. The main vehicle body frame 4 is formed of main frame elements consisting of a head pipe 5, a pair of left and right rectangular main frame pipes 6 connected to the head pipe 5 and extending towards the rear of the vehicle body at an inclined attitude, a pair of left and right lower frame pipes 7 extending downwardly from the neighborhood of the head pipe 5 and thereafter extending toward the rear of the vehicle body, a pair of left and right seat support pipes 8 connected to the rear end portions of the main frame pipes 6 and extending toward the rear of the vehicle body, and a pair of left and right central frame pipes 9. The rear vehicle body frame 10, as shown in FIG. 3, is formed of main frame elements consisting of a pair of left and right upper pipes 11, a transverse connecting member 12 for connecting the left and right upper pipes 11 a pair of left and right front inclined pipes 14, a pair of left and right rear vertical pipes 15, a transverse connecting pipe 13 for connecting the left and right rear vertical pipes 15 a pair of left and right lower vertical pipes 16 connected to the front portion of the respective front inclined pipes 14 and extending downwardly, and lower horizontal pipes 17 connecting the lower vertical pipes 16, respectively, with the rear vertical pipes 15. The mounting of the rear vehicle body frame 10 to the main vehicle body frame 4 is effected by threadedly coupling the front ends of the left and right upper pipes 11 with the rear ends of the left and right seat support pipes 8 (point A in FIG. 2) and by threadedly coupling the front ends of the left and right front inclined pipes 14 with the rear ends of the left and right central frame pipes 9 (point B in FIG. 2). A fuel tank T is placed on the left and right main frame pipes 6, and a rider's seat 18 and an attendant rider's seat 19 are placed in tandem on the left and right seat support pipes 8.

The rear vehicle body frame 10 has a frame structure adapted to surround the upper end portion of the rear wheel RW. A central trunk 24 is fixed to the left and right upper pipes 11 of the rear vehicle body frame 10 so as to bridge them. A left trunk 55, consisting of a trunk box main body 56 and a trunk openable lid 57, is fixed along the front inclined pipe 14 and the rear vertical pipe 15 positioned on the left side of the vehicle body, and a right trunk 58, consisting of a trunk box main body 59 and a trunk openable lid 60, is fixed along the front inclined pipe 14 and the rear vertical pipe 15 positioned on the right side of the vehicle body.

As seen from FIG. 3, the central trunk 24 is fixed to the rear vehicle body frame 10 by threadedly securing its main body bottom portion from the inner space side by means of four bolts (points C and D in FIG. 3), and the left and right trunks 55 and 58 are fixed to the rear vehicle body frame 10 by threadedly securing their main body side wall portions from the inner space side by means of two bolts and also by threadedly securing their bottom wall portions from the outside by means of two bolts (points E and F and points G and H, respectively, in FIG. 3).

A rear fender 61 is threadedly secured to the left and right rear vertical pipes 15 via a joint rod 63, and into the respective pairs of locking holes 62 formed on respective sides of this rear fender 61 are inserted the respective pairs of locking tabs 56a and 59a of the left and right trunks 55 and 58, respectively. Ornamental cover members 64 are threadedly secured to the left and right trunks 55 and 58, respectively, and the rear fender 61 so as to bridge the left trunk 55 and the rear fender 61 and to bridge the right trunk 58 and the rear fender 61, and thereby an integrated appearance is given to the left and right trunks 55 and 58 and the rear fender 61. In addition, to the rear fender 61 are mounted a number plate and a reflecting mirror 65.

Figure 4:
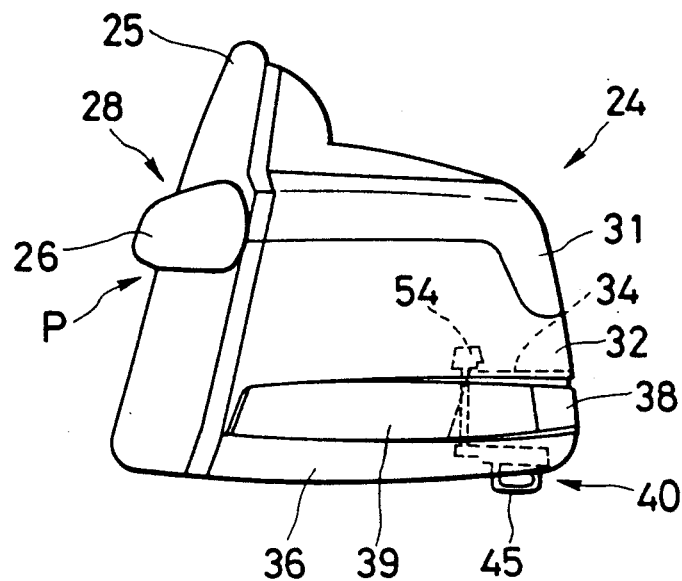
FIG. 4 is a side view of the central trunk in the trunk assembly.
Figure 5:
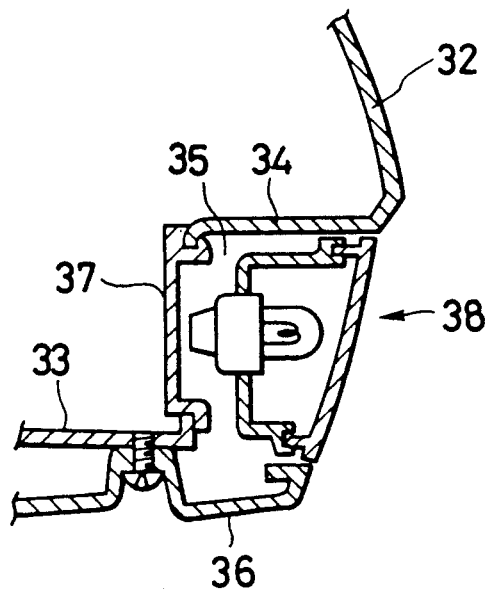
FIG. 5 is a vertical cross-section view of the central trunk of FIG. 4.

As shown in FIGS. 4 and 5, the central trunk 24 is formed of main constituent members consisting of a trunk box main body 32 and a trunk shutting lid 31 covering the main body 32. On the front surface of the trunk shutting lid 31 is provided a back rest 25 at the central portion in the widthwise direction of the vehicle, and armrest base boxes 26 are associated therewith on the left and on the right of the backrest 25. Reference character P designates a fulcrum position for opening and closing the trunk shutting lid 31. In addition, at the lower position of the side surface of the trunk box main body 32 is associated an ornamental cover member 39, and on the lower surface thereof is associated a lower surface cover member 36. At the lower portion of the rear surface of the trunk box main body 32 is formed a recess 35 along the widthwise direction of the vehicle, in which is assembled a tail lamp assembly 38. The recess 35 is delimited by an inwardly offset wall 34 of the trunk box main body 32 and the lower surface cover member 36, and a shutting lid 37 is fitted in an opening formed in the wall 34 so as to cover the opening. This shutting lid 37 can be removed from the side interior side of the trunk box main body, and therefore, by removing the shutting lid 37, replacement of a lamp in the tail lamp assembly 38 can be done. It is to be noted that ridges 56b and 59b projected from the top surfaces of the trunk box main bodies 56 and 59 in the left trunk 55 and the right trunk 58, respectively, come sufficiently close to the bottom wall 33 of the trunk box main body 32 in the central trunk 24 to prevent mud splashed by the rear wheel RW from spattering out to the trunk shutting lids 57 and 60 of the left trunk 55 and the right trunk 58.

Figure 6:
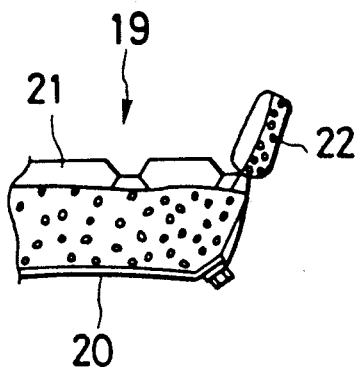
FIG. 6 is a vertical cross-section view showing a rear portion of an attendant rider's seat of the motorcycle of FIG. 1.
Figure 7:
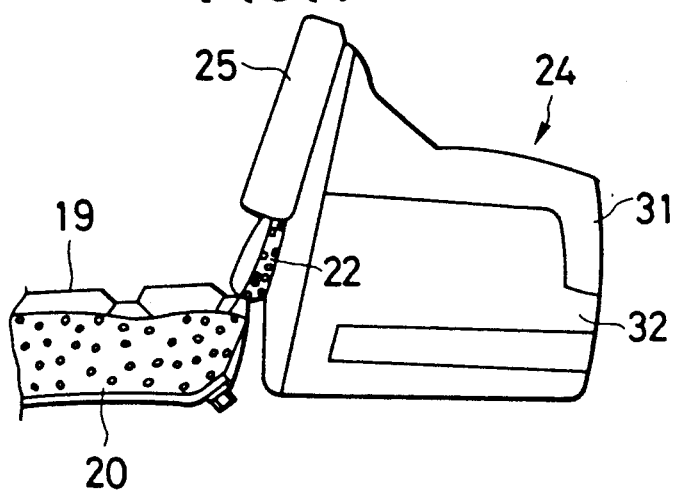
FIG. 7 is a schematic view showing the relation between the rear portion of the attendant rider's seat and the central trunk.
Figure 8:
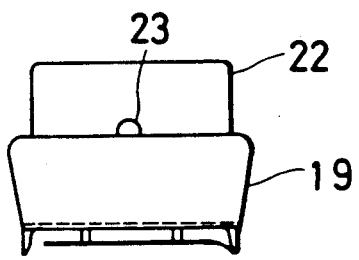
FIG. 8 is a somewhat schematic view of the same attendant rider's seat as viewed from the front of the vehicle body.

As shown in FIGS. 6 to 8, the lower lateral edge of the central portion of the back rest 25 attached to the front surface of the trunk shutting lid 31 is located at a higher level than the sitting surface of the attendant rider's seat 19, and the gap space between them is blocked by an under-backrest buffer 22 that is formed integrally with the attendant rider's seat 19. The seat 19, the back-rest 25 and the under-backrest buffer are of conventional cushion construction having an interior resilient filler covered by an outer skin. The under-backrest buffer 22 is connected integrally with the attendant rider's seat 19 with only its outer skin sewn with an outer skin 21 of the attendant rider's seat 19, and is not supported by the bottom plate 20 of the attendant rider's seat 19. However, as its back surface is supported by the trunk box main body 32, it does not necessitate support by the bottom plate 20. In addition, in the portion where the outer skin of the under-backrest buffer 22 connects with the attendant rider's seat 19, a water drain port 23 is formedly positioned at the center in the widthwise direction of the vehicle so that rain water will not stay on the sitting surface of the attendant rider's seat 19.

Figure 9:
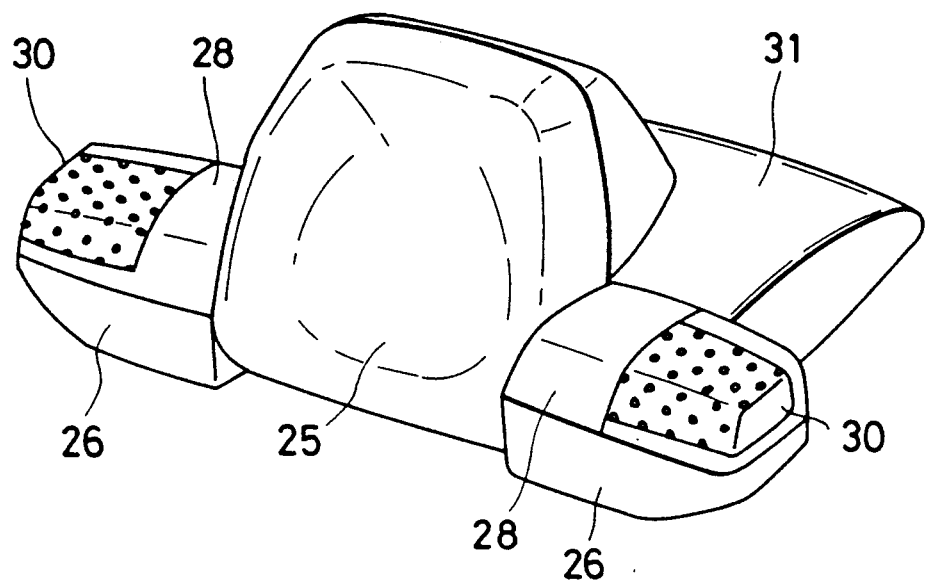
FIG. 9 is a perspective view showing a shutting lid of the central trunk integrally provided with a back rest and armrests of the attendant rider's seat.
Figure 10:
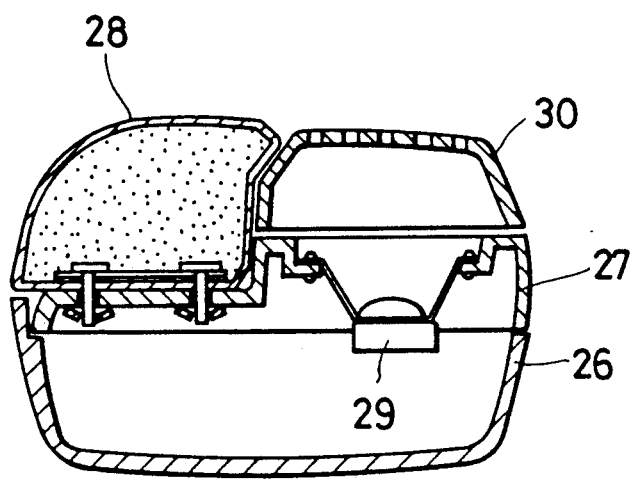
FIG. 10 is a vertical cross-section view of the same armrest and its base box.

As shown in FIGS. 9 and 10, the armrest base boxes 26 attached to the left and right portions of the trunk shutting lid 31 jointly with the back rest 25, serve also as loudspeaker boxes. A lid body 27 covers the upper surface of the armrest base box 26 consisting of a cup-shaped body. An armrest 28 composed of a core body made of foamed resin and an outer skin is associated with the armrest base box 26 so as to cover the inner lateral portion of the respective lid bodies 27. A loudspeaker 29 attached to an opening in the lid body 27 is covered by a loudspeaker grille 30.

Figure 11:
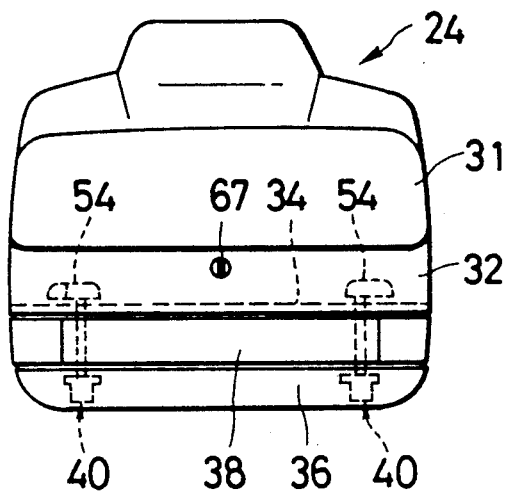
FIG. 11 is a rear view of the central trunk.
Figure 12:
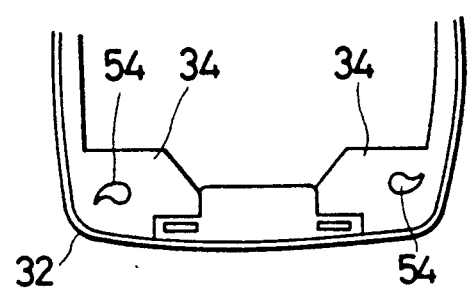
FIG. 12 is a partial plan view of the inside of the central trunk, as viewed from above.
Figure 13:
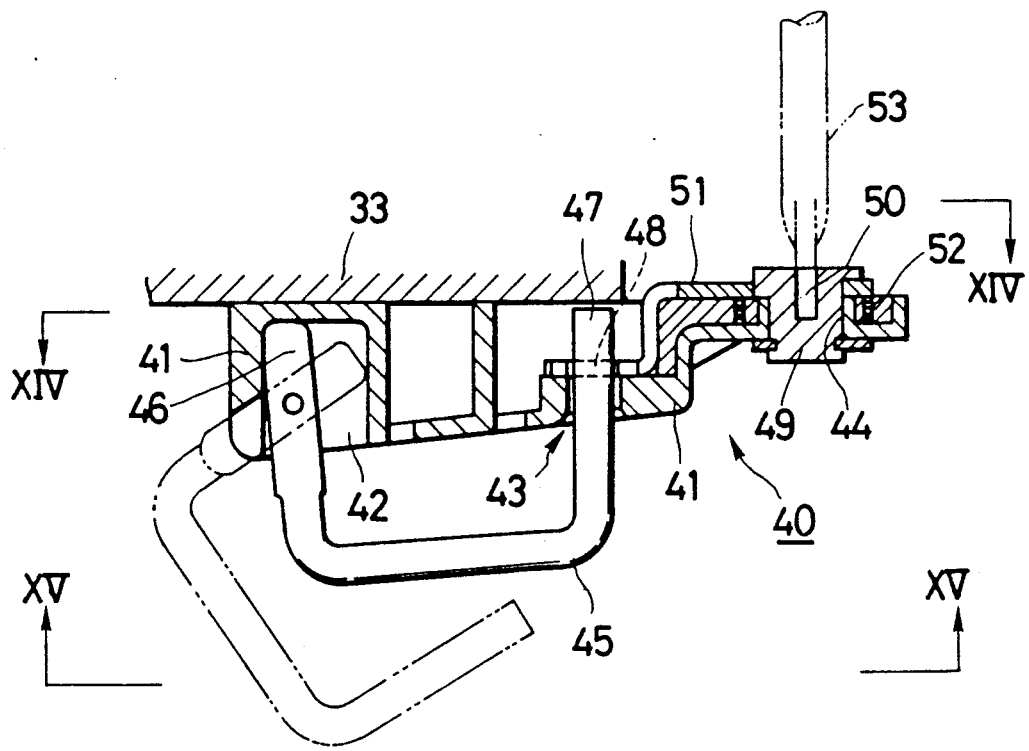
FIG. 13 is a vertical cross-section side view of an essential part of a helmet locking member provided at the bottom of the central trunk.
Figure 14:
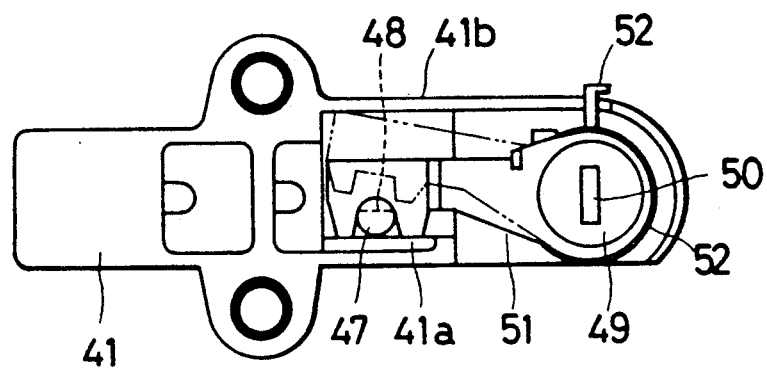
FIG. 14 is a top view taken along line XIV—XIV in FIG. 13, as viewed in the direction of arrows.
Figure 15:
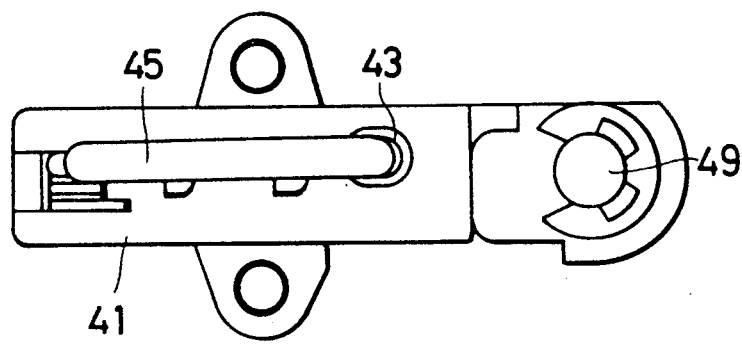
FIG. 15 is a bottom view taken along line XV—XV in FIG. 13, as viewed in the direction of arrows.
Figure 16:
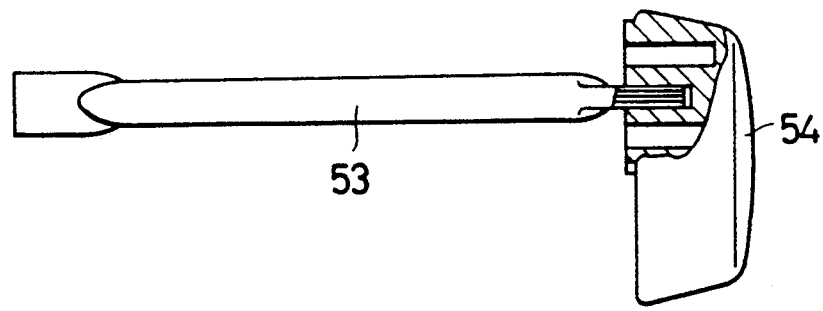
FIG. 16 is a side view, partly cut away, of a manipulation rod and a manipulator for the helmet locking member.

Furthermore, as shown in FIGS. 4 and 11, helmet anchoring devices 40 manipulated by respective manipulators, 54 are provided on the bottom wall 33 of the trunk box main body 32 and positioned on the left and on the right of the rear portion of the central trunk 24. The helmet anchoring device 40 as sown in FIGS. 13 to 15, is formed principally of a metal base frame 41, a U-shaped hook 45 for directly hooking a helmet, and a swingable locking piece 51 for locking the hook 45. The base frame 41 fixedly secured to the bottom wall 33 of the trunk box main body 32 has a recess 42 at one end portion, an aperture 43 at an intermediate portion, and another aperture 44 at the other end portion. The hook 45 is swingably supported from the base frame 41 at its base end portion inserted into the recess 42, so that it can swing between a first attitude (solid lines in FIG. 13) where a tip end portion 47 penetrates through the opening 43 of the base frame 41 and a second attitude (double-dot chain lines in FIG. 13) where the tip end portion 47 is disengaged from the aperture 43. The swingable locking piece 51 is fixedly attached to a rotary shaft 49 that penetrates through the opening 44 of the base frame 41 so as to rotate jointly with this rotary shaft 49, and is angularly biased by a return spring 52 that surrounds the rotary shaft 49 so that the locking piece engages an anchoring groove 48 formed at the tip end portion 47 of the hook 45 that penetrates through the aperture 43. The swingable range of the swingable locking piece 51 is defined by walls 41a and 41b of the base frame 41. Consequently, and under the condition where the locking piece 51 is biased under the biasing force of the return spring 52, a forked tip end portion of the swingable locking piece 51 engages with the anchoring groove 48 and butts against the wall 41a (solid lines in FIG. 14). On the other hand, when the swingable locking piece 51 is made to swing against the resilient force of the return spring 52 by manipulating a manipulator 54 as will be described later, or when the hook 45 is held at the state shown by double-dot chain lines in FIG. 13 is moved and forced to rise up to the state shown by solid lines, the back side of the forked portion of the swingable locking piece 51 would butt against the wall 41b (double-dot chain lines in FIG. 14).

The rotary shaft 49 has a groove 50 on its top surface, and a flat bottom end portion of a manipulating rod 53 is fitted into the groove 50. The manipulating rod 53 having a manipulator 54 attached to its top end is adapted to penetrate through the offset wall 34 of the trunk box main body 32, and is supported for rotation thereby. Therefore, the swingable locking piece 51 can be made to swing by opening the trunk shutting lid 31, inserting a hand into the trunk box main body 32, gripping the manipulator 54 and thus rotating the manipulating rod 53 (FIGS. 11 through 14).

Figure 17:
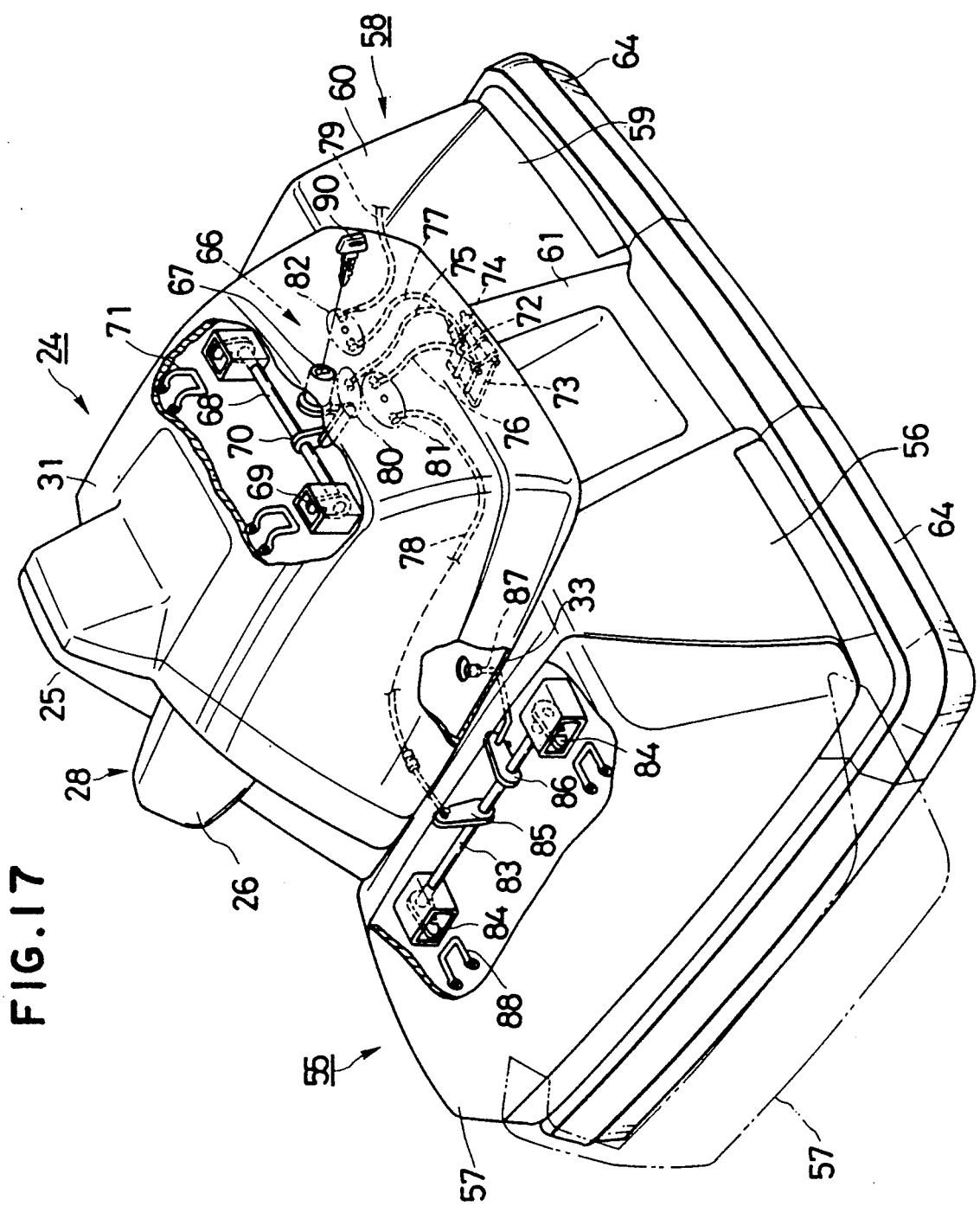
FIG. 17 is a perspective view of the trunk assembly with parts cut away, as viewed from the left rear side.

The central trunk 24 and the left and right trunks 55 and 58 are formed as previously described. The shutting lids 31, 57 and 60 of these trunks can be freely opened or closed by the operation of a central trunk operator 72, a left trunk operator 73 and a right trunk operator 74, all of which are centrally disposed and attached to the exterior bottom surface of the central trunk 24 (FIG. 17). Such arrangement is described in detail in U.S. patent application Ser. No. 119,840, filed Nov. 12, 1987 by Tai Nakashima et al., the disclosure of which is incorporated herein by reference. More particularly, when the respective shutting lids 31, 57 and 60 are closed, they can be readily opened under the condition where the locking device 66 is unlocked, by simply operating the central trunk manipulator 72 attached to the bottom surface of the central trunk 24 to move this trunk manipulator 72 downwardly, then a ganged operation piece 70 is moved via a wire 75 and a coupling/idling mechanism 80, such that the shaft 68 supported from brackets on the trunk box main body 32 is rotated. Consequently, hooks 69 at the opposite ends of the shaft 68 are disengaged from a pair of anchoring members 71 on the side of the trunk shutting lid 31, and the trunk shutting lid 31 can be opened. Also, if the left trunk manipulator 73 positioned on the left side of the central trunk manipulator 72 is moved downwardly, then the ganged operation piece 85 is moved via a wire 76, a coupling/idling mechanism 81 and a wire 78, such that a shaft 83 supported from the trunk box main body 56 of the left trunk 55 is rotated. Thus, hooks 84 at the opposite ends of the shaft 83 are disengaged from a pair of anchoring members 88 on the side of the trunk shutting lid 57, and the trunk shutting lid 57 can be opened. Further, if the right trunk manipulator 74 positioned on the right side of the central trunk manipulator 72, is moved downwardly, then a locking mechanism of the right trunk 58 similar to the above-described locking mechanism of the left trunk 55, is actuated via a wire 77, a coupling/idling mechanism 82 and a wire 79, and the trunk shutting lid 60 can be opened.

In addition, if a spare manipulation rod 87 having its top end positioned at an opening formed in the bottom wall 33 of the central trunk 24, is pushed by a finger, when the shutting lid 31 is opened, a ganged operation piece 86 is moved, and similarly to the case where the left trunk manipulator 73 is manipulated, the engagement between the hooks 84 and the anchoring members 88 is released. With respect to the right trunk 58 also, similar provision is made.

Under the condition where the locking device 66 is locked, the coupling/idling mechanisms 80, 81 and 82 would take idling states, and so, even if the central trunk manipulator 72, the left trunk manipulator 73 or the right trunk manipulator 74 is manipulated, the trunk shutting lid 31, 37 or 60, respectively, cannot be opened.

Upon carrying out assembly of the motorcycle 1, preliminarily outside of a main assembly line, equipment such as the central trunk 24, the left trunk 55, the right trunk 58, the rear fender 61, and the like are mounted to the rear vehicle body frame 10 to from an integrated trunk assembly. Then, in the main assembly line, the rear vehicle body frame 10 is coupled to the main vehicle body frame 4 by threadedly coupling the tip ends of the upper pipes 11 and the front inclined pipes 14 to the rear ends of the seat support pipes 8 and the central frame pipes 9, respectively. Thereafter, a wire harness (electric conductor wires) on the main vehicle body side is connected to a wire harness on the trunk assembly side. The above-mentioned assembly in the main assembly line requires fewer manhours; is simple, and can contribute to improvements in productivity. In addition, since matching of the assembled positional relationship among the equipment respective pieces of equipment, such as the central trunk 24, the left trunk 55, the right trunk 58, the rear fender 61, and the like, can be achieved outside of the main assembly line, not only is the adjustment is easy, but also there made no need to perform the adjustment after completion of assembly of the vehicle body. Therefore in this respect also, the present invention can contribute to improvements in productivity.

When the need to replace the rear wheel tire RW of the motorcycle 1 arises, it is only necessary to remove the entire trunk assembly jointly with the rear vehicle body frame 10 without individually dismounting a large number of equipment individual pieces of equipment, such as the central trunk 24, the left trunk 55, the right trunk 58, the rear fender 61 and the like, and therefore, the tire replacement work can be carried out efficiently.

While, in the prior art, the bottom plate 20 of the attendant rider's seat 19 was made long enough to support the under-backrest buffer 22 in the illustrated embodiment, since provision is made such that the under-backrest buffer 22 can be supported by the trunk box main body 32 of the central trunk 24, reduction of cost and weight by sparing materials can be realized. In addition, as the attendant rider's seat 19 and the under-backrest buffer 22 are formed as a continuous body by sewing the outer skin of the under-backrest buffer 22 with the outer skin of the attendant rider's seat 19, rain water staying on the sitting surface of the attendant rider's seat 19 can be smoothly drained through the water drain port 23. More particularly, if as is the case with the prior art, a core material made of foamed resin of the attendant rider's seat 19 and that of the under-backrest buffer 22 are formed integrally and the bottom plate 20 extends up to the under-backrest buffer 22, draining cannot be achieved smoothly even if a water drain port is provided.

The armrest 28, consisting of a core material made of foamed resin and an outer skin, can be produced by blow molding, hence the shape and sizes thereof for mounting onto the armrest base box 26 can be defined correctly, and also, since it does not involve the structure in which the outer skin of the attendant rider's seat 19 and the outer skin of the armrest 28 are sewed integrally, less manual work is involved as compared to the assembly of similar type of armrests in the prior art, and so, the present invention can contribute further to improvements in productivity.

In the case of a helmet anchoring member in the prior art, since it was designed to be locked or unlocked by manipulating a dedicated locking device, either a key had to be inserted into a key hole while pushing aside an anchored helmet, or a key hole positioned on the underside of the trunk had to be located while taking a crouching attitude, but in the case of the illustrated embodiment it is only necessary to move the manipulator 54 located within the central trunk 24, and the helmet can be disengaged easily and quickly from the helmet anchoring member 40.

Since the principal portion of the helmet anchoring member 40 is covered by the lower surface cover member 36 so that only the hooks 45 can be as the exterior of the vehicle body or the rear of the vehicle body is viewed, the appearance is excellent.

Since locking and unlocking of the left and right trunks 55 and 58 can be carried out by means of the locking device 66 provided at the central trunk 24 and by manipulating the left trunk manipulator 73 and the right trunk manipulator 74 and there is no need to perform key operations for the respective trunks, the locking structure is convenient and involves no complication.

What is claimed is:

1. A motorcycle comprising:
a front body frame mounting an engine and longitudinally spaced front and rear wheels;
a rear body frame;
a trunk assembly;
means on said rear body frame for fixedly attaching said trunk assembly;
said rear body frame being positioned longitudinally rearwardly of said front body frame to locate said trunk assembly in enclosing relation with respect to said rear wheel to form the cover thereof;
means for detachably connecting said rear body frame to said front body frame, whereby detachment of said connecting means permits removal of said rear body frame and said trunk assembly to expose said rear wheel; and
a helmet anchoring device attached to said trunk assembly, said device comprising a helmet hook, a swingable locking piece for lockingly securing said helmet hook in its closed position, and means disposed in the interior of said trunk assembly for operating said locking piece.

2. A motorcycle according to claim 1 in which said helmet anchoring device comprises a base frame attached to said trunk assembly, a movable locking piece including a hook-shaped member for attaching a helmet, a rotatable pivot mounting said locking piece penetrating a wall of said trunk assembly, and a locking piece manipulator disposed interiorly of said trunk assembly having one end engaging said rotatable pivot and its other end mounting a handle.

3. A motorcycle comprising:
a body frame;
a trunk assembly attached to said body frame;
a helmet anchoring device attached to said trunk assembly, said device including openable and closeable means for securing a helmet;
a swingable locking piece engageable with said helmet securing means for securing said helmet securing means in its closed position; and
means disposed in the interior of said trunk assembly for operating said locking piece.

4. A motorcycle according to claim 3 in which said helmet anchoring device comprises a base frame attached to said trunk assembly, a movable locking piece including a hook-shaped member for attaching a helmet, a rotatable pivot mounting said locking piece penetrating a wall of said trunk assembly, and a locking piece manipulator disposed interiorly of said trunk assembly having one end engaging said rotatable pivot and its other end mounting a handle.

5. A motorcycle comprising:
a body frame;
a trunk assembly disposed on a rearward portion of said body frame;
a seat spaced forwardly of said trunk assembly and including a cushion construction having an interior resilient filler and an exterior covering skin whose upper face forms a sitting surface;

a bottom plate supported by said body frame and mounting said seat, said bottom plate extending beneath said seat to a position spaced from said trunk assembly and defining a space therebetween;

a backrest disposed on said trunk assembly adjacent said seat and having a bottom edge vertically spaced above said sitting surface of said seat;

an under-backrest buffer having a cushion construction similar to that of said extending across said space between said seat and said backrest bottom, and including a water drain port communicating with said space, said drain port being disposed adjacent the connection formed by a sewn attachment between said seat and said under-backrest buffer.

6. A motorcycle according to claim 5 in which said water drain port is formed in said under-backrest buffer.

7. A motorcycle comprising:

a front body frame mounting an engine and longitudinally spaced front and rear wheels;

a rear body frame;

a trunk assembly including laterally spaced left and right trunks disposed on opposite sides of said rear wheel and a central trunk overlying said rear wheel, each of said trunks having generally rectangularly disposed front, rear and lateral side surfaces defining a box-like structure and a shutting lid for closing the top thereof;

means on said rear body frame for fixedly attaching said trunk assembly;

means forming a recess in the rear surface of said central trunk and a tail light assembly disposed in said recess, said recess forming means including a shutting lid removably attached to said central trunk and accessible from the interior thereof for accessing said tail light assembly;

said rear body frame being positioned longitudinally rearwardly of said front body frame to locate said trunk assembly in enclosing relation with respect to said rear wheel to form the cover thereof; and means for detachably connecting said rear body frame to said front body frame, whereby detachment of said connecting means permits removal of said rear body frame and said trunk assembly to expose said rear wheel.

8. A motorcycle comprising:

a front body frame mounting an engine and longitudinally spaced front and rear wheels;

a rear body frame;

a trunk assembly including laterally spaced left and right trunks disposed on opposite sides of said rear wheel and a central trunk overlying said rear wheel, each of said trunks having generally rectangularly disposed front, rear and lateral side surfaces defining a box-like structure and a shutting lid for closing the top thereof;

a seat on said front body frame; a sitting surface on said seat; a backrest disposed on said central trunk front surface and having its bottom edge vertically spaced above the sitting surface of said seat; and an under-backrest buffer positioned intermediate the sitting surface of said seat and said backrest bottom edge, said seat, said backrest and said under-backrest buffer each being defined by a cushion construction including an interior resilient filler and an exterior covering skin, and wherein said under-backrest bluffer is connected to said seat by a sewn attachment of the respective covering skins thereof;

said seat having a bottom plate supported by said front body frame, means forming a space between said bottom plate and said central trunk front surface, and a water drain port formed adjacent the connection between said seat and said under-backrest buffer communicating with said space;

means on said rear body frame for fixedly attaching said trunk assembly;

said rear body frame being positioned longitudinally rearwardly of said front body frame to locate said trunk assembly in enclosing relation with respect to said rear wheel to form the cover thereof; and means for detachably connecting said rear body frame to said front body frame, whereby detachment of said connecting means permits removal of said rear body frame and said trunk assembly to expose said rear wheel.

9. A motorcycle comprising:

a front body frame mounting an engine and longitudinally spaced front and rear wheels;

a rear body frame;

a trunk assembly fixedly attached to said rear body frame and having vertically spaced sides and a top member operating to define a covered space for reception of said rear wheel, said trunk assembly including laterally spaced left and right trunks disposed on opposite sides of said rear wheel and a central trunk extending between said left and right trunks and overlying said rear wheel, each of said trunks being separately connected to said rear body frame and having generally rectangularly disposed front, rear and lateral side surfaces defining a box-like structure and a shutting lid for closing the top thereof;

a rear fender extending between said left and right trunks beneath said central trunk, said rear fender being connected to said left and right trunks and to said rear body frame respectively;

said rear body frame being positioned longitudinally rearwardly of said front body frame to operably dispose said rear wheel in confronting, face-to-face relation with said trunk assembly within the space formed thereby;

means for releasably connecting said rear body frame to said front body frame, whereby release of said connecting means permits removal of said rear body frame and said trunk assembly as a unit to expose said rear wheel;

a seat on said front body frame; a sitting surface on said seat; a backrest disposed on said central trunk front surface and having its bottom edge vertically spaced above the sitting surface of said seat; an under-backrest buffer positioned intermediate the sitting surface of said seat and said backrest bottom edge;

said backrest and said under-backrest buffer each being defined by a cushion construction including an interior resilient filler and an exterior covering skin, wherein said under-backrest buffer is connected to said seat by a sewn attachment of the respective covering skins thereof;

said seat including a bottom plate supported by said front body frame, means forming a space between said bottom plate and said central trunk front surface, and a water drain port formed in said under-backrest buffer adjacent the connection between said seat and said under-backrest buffer and communicating with said space.

* * * * *